United States Patent Office

PTO - BOYERS, PA Duty Station

MISSING PAGE TEMPORARY NOTICE

PATENT # 2361X FOR ISSUE DATE 4-28-1815

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

Drawings

Data Conversion Operation

Boyers, Pa

2301X

John Kneas.

April 28,1815.

Bank Note Printing.

xxxxxxxx the schedule referred to in which said Letters Patent and making part of the same containing a description in the words of the said John himself of his said improvement in the words following to wit:

The mode of printing copper plates is with a rolling press consisting of two rollers, supported by two sides or checks by means of gudgeons or spindles which go through the rollers and extend beyond each end of the roller about three inches, the ends of the gudgeons or spindles rest on mortises made in the sides or checks of the press; between the rollers moves a plank as wide as the rollers are long on which the copper plate is laid after having the ink properly rubbed in the engraved work that may be on it and carefully and clearly wiped off the surface of the plate with the palm of the hand, and gently heated by a charcoal fire, around the upper roller of the press is wrapped three or four thicknesses of superfine cloth, then by means of a cross-lever attached to the spindle or gudgeon of the upper roller the plank and copper plate which is laid thereon covered with damped paper passes between the rollers when the impression is made on one side of the paper. For printing on the reversed side the plate must be prepared with ink as before mentioned laid on the plank of the press and the imprinted side of the paper which must be damped again for the second operation as before mentioned must be laid on the plate to prevent the first impression being injured by the second operation and to prevent the cloth on the roller being soiled or dirtied by the ink transfering on it from the first impression made on the paper to be so printed a piece of clean paper, silk or muslin must be laid over or on the paper already laid on the plate to receive the second impression being so prepared it is a second time passed between the rollers, when the impression is perfect it is then taken and carefilly dried and pressed in a screw press; much care is necessary in the operation to have the work look well and kept clean. The improvement ot appli- x x x x x. I wish to secure is to print copper plate on both sides of the note or bill.or copperplate on one side and letter press on the other, or letter press on both sides of a bank note or bill as an additional security against counterfeiture.

See--

Kneas vs. Schuykill Bank.

4. Wash. 9.

Restored Patents: Volume 4. p. 437.